April 3, 1973 H. MEMBRINO 3,725,180
BAG-MAKING MACHINE FOR THERMOPLASTIC BAGS
Filed April 23, 1971 3 Sheets-Sheet 3

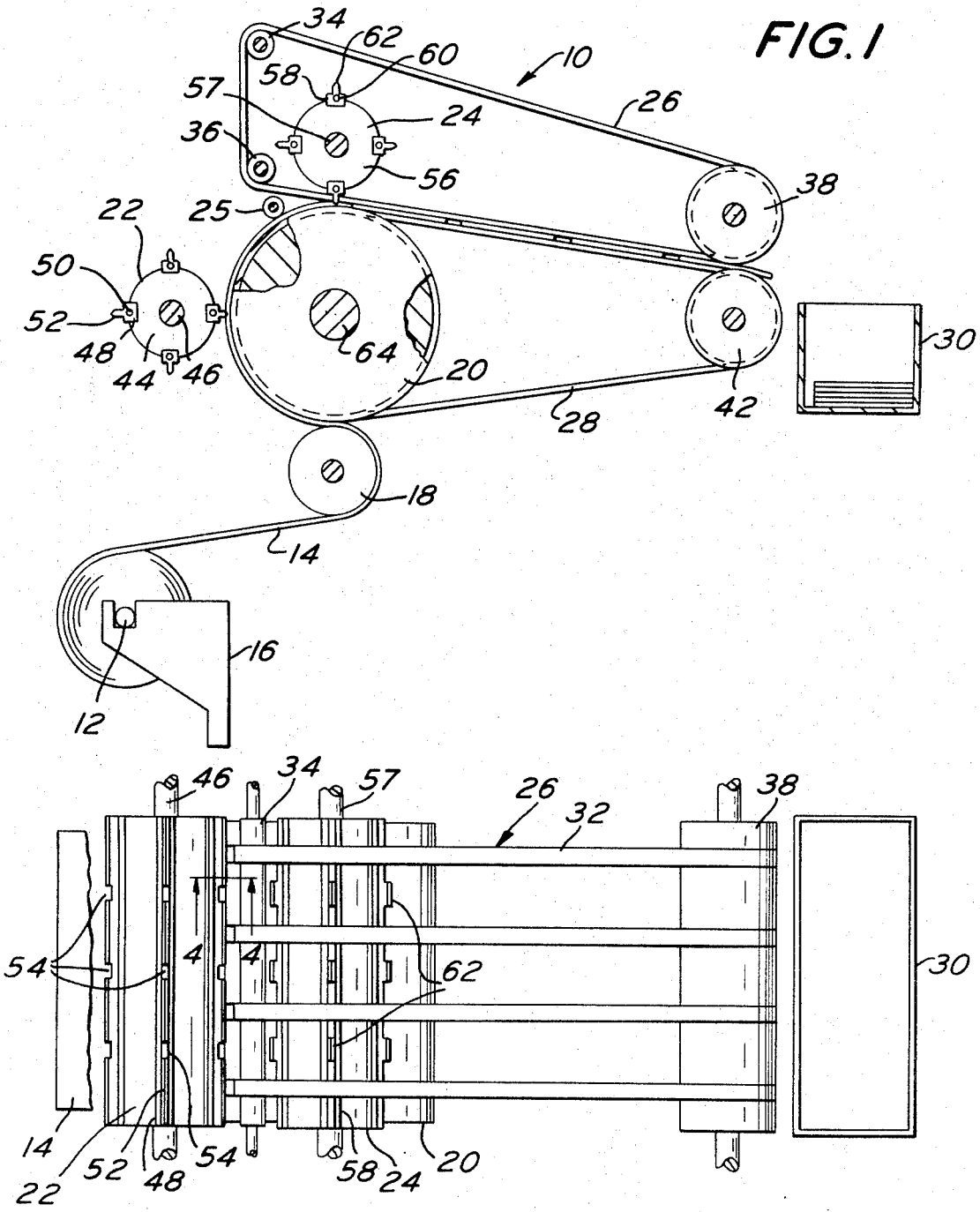

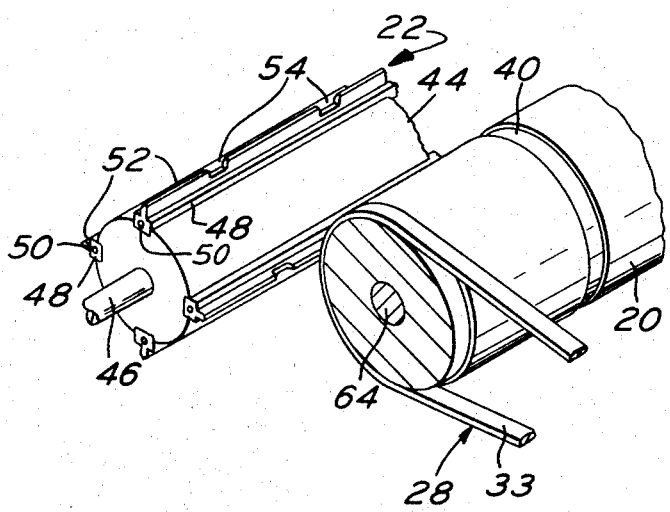
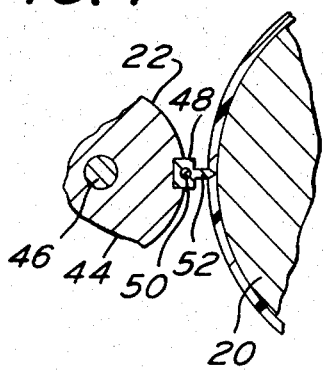
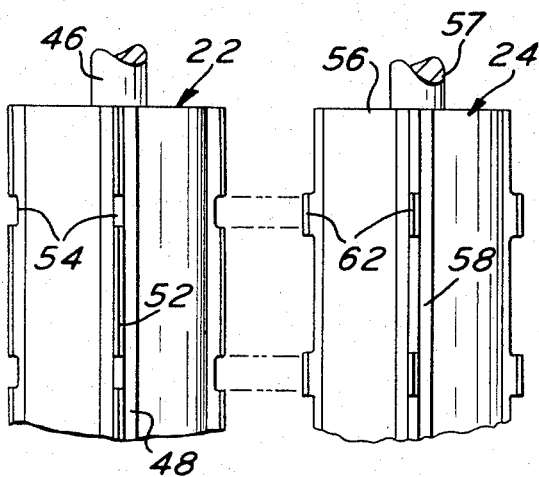
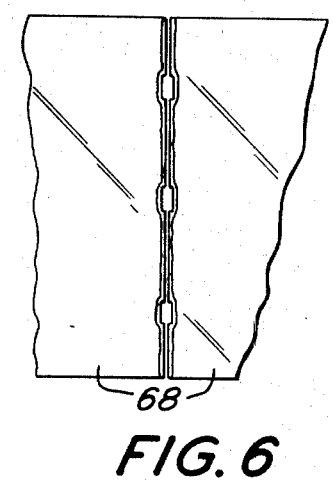
INVENTOR
HERCULES MEMBRINO

INVENTOR
HERCULES MEMBRINO
BY
ATTORNEY

United States Patent Office 3,725,180
Patented Apr. 3, 1973

3,725,180
BAG-MAKING MACHINE FOR THERMOPLASTIC BAGS
Hercules Membrino, 1934 Arch St., Philadelphia, Pa. 19103
Continuation-in-part of application Ser. No. 874,523, Nov. 6, 1969, now Patent No. 3,616,095. This application Apr. 23, 1971, Ser. No. 136,862
Int. Cl. B32b 31/00
U.S. Cl. 156—515     12 Claims

ABSTRACT OF THE DISCLOSURE

A bag-making machine comprising either a rotatable heat sealing means coacting with an impression roller to simultaneously seal and sever portions of a double ply or tubular thermoplastic strip to form individual bags. The sealing means comprises an assembly including one or more heated knives, which assembly is so constructed that small portions along the length of the knives are prevented from severing the strip, thereby forming connecting means or "nips" between the bags. This is accomplished by forming small recesses in the knives or by providing a masking plate having areas which mask portions of the knives while contact is made with the strip. A rotatable severing means is provided downstream from the heat sealing means and coacts with the impression roller to sever the nips. A conveyor means is provided adjacent the severing means to support the completed and separated bags and to convey them from the machine.

---

This is a continuation-in-part of copending application Ser. No. 874,523, filed Nov. 6, 1969, now Pat. No. 3,616,095, now issued as Pat. No. 3,616,095, dated Oct. 26, 1971.

This invention relates to a machine for making thermoplastic bags, and it particularly relates to a machine of this type wherein the bags can be made in a continuous strip and then separated.

In the aforesaid copending application, it was explained that prior machines for making bags in a continuous strip resulted in the formation of small holes or perforations due to the use of connecting "nips" or unsealed portions to keep the bags connected. When these "nips" were broken to disconnect the bags, the perforations remained. In the apparatus disclosed in the aforesaid application, this was overcome by utilizing projections to push the material at certain areas away from the heated sealing wires just a sufficient amount so that the heat from the heated wires would weld the bags at these areas but would not penetrate sufficiently through to sever the bags. In this manner, these areas would form "sealed nips" which, when broken, would still form a sealed edge.

It has now been discovered that the same "sealed nips" can be formed by utilizing heated bars or knives, rather than wires, and by providing recesses or grooves in the knives at the "nip"-forming areas. The grooves are of such depth that sufficient heat is applied to the bag material at the selected areas to weld the material but the transfer of heat would be insufficient to sever the material.

The use of these grooved heat-sealing knives permit the use of this invention on machines for making large size bags whereas the prior method required the use of heated sealing wires which are more generally adapted only to the manufacture of relatively small bags. Furthermore, the present invention may be utilized in both continuous and intermittent type machines, as well as with both rotary and reciprocating type sealing heads.

It is, therefore, one object of the present invention to provide a bag-making machine where thermoplastic bags may be made in continuous strips and then severed without the formation of holes or perforations in the bags.

Another object of the present invention is to provide a machine of the aforesaid type where heated bars or knives may be used as the sealing and severing means.

Another object of the present invention is to provide a machine of the aforesaid type which is adapted to be used either continuously or intermittently, and with either a rotary or reciprocating sealing head.

Another object of the present invention is to provide a machine of the aforesaid type where additional equipment to break the connecting "nips" is obviated.

Other objects and many of the attendant advantages of this invention will be readily appreciated as the same becomes better understood by reference to the following description when read in conjunction with the accompanying drawings wherein:

FIG. 1 is a somewhat diagrammatic side elevational view of a machine embodying the present invention.

FIG. 2 is a top plan view of the machine of FIG. 1.

FIG. 3 is a fragmentary perspective view showing the relationship between the sealing head and the impression roller of the machine of FIG. 1.

FIG. 4 is a fragmentary cross-sectional view taken on line 4—4 of FIG. 2.

FIG. 5 is a fragmentary side elevational view showing the bag material after it has been treated by the sealing head.

FIG. 6 is a view similar to FIG. 5 but showing the material after it has been severed into individual bags.

FIG. 7 is a fragmentary top plan view showing the relationship between the sealing head and "nip" severing head.

Figure 8:
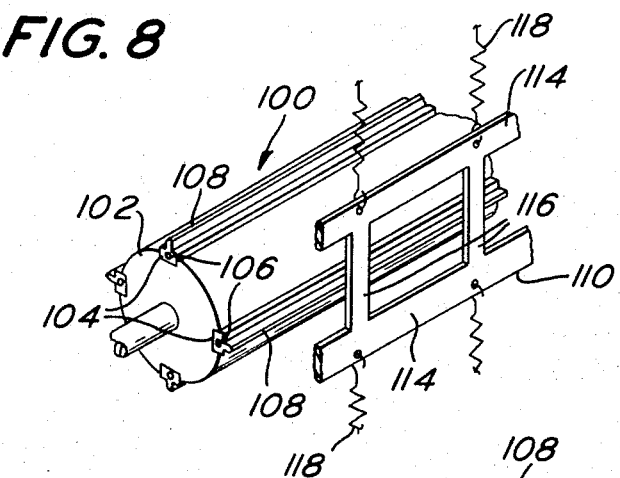
FIG. 8 is a fragmentary perspective view of a sealing head assembly embodying an alternative form of the invention.

Referring now in greater detail to the various figures of the drawings wherein similar reference characters refer to similar parts, there is shown in FIG. 1 a bag making assembly, generally designated 10, which comprises a supply spindle 12 holding a double-ply roll of thermoplastic strip material 14 which may be flat double-ply sheet material or tubular material. The term "double-ply" is here used generically to mean both flat stock and tubular stock. The spindle 12 is mounted on a bracket 16 which is attached to the machine frame (not shown) or to any other desired support means.

The strip 14 moves around a draw roller 18 mounted on the machine frame, and then around an impression roller 20. As it passes around the impression roller 20, the strip 14 is acted upon by a rotatable heat sealing head 22. The strip 14 then is acted upon by a rotatable severing head 24. The draw roller 18 acts to pull the strip from the roll on spindle 12 and around the impression roller 20. A pinch roller, indicated at 25, is provided for the purpose of holding the strip against the impression roller. This pinch roller 25 is preferably positioned in tangency to the impression roller 20 immediately adjacent to but spaced from the head 24, between the head 22 and the head 24.

Upper and lower conveyors, respectively designated 26 and 28 are provided for the purpose of frictionally engaging the severed bags between them and moving these bags for deposit in a bin or the like indicated at 30. Each of these conveyors comprises a plurality of parallel endless belts or tapes, respectively designated 32 and 33.

The tapes 32 comprising the upper conveyor 26 are supported by upper and lower rollers 34 and 36 at one end, and by a roller 38 at the other end. The roller 38 is provided with peripheral grooves to receive the corresponding tapes 32.

The tapes 33 of the lower conveyor 28 are supported at one end in corresponding peripheral grooves 40 on the impression roller 20 (as best seen in FIG. 3). At the other end, they are supported by a roller 42 similar to roller 38.

The rollers 18, 20, 25, 34, 36, 38 and 42 are driven in timed relationship with each other and with the heads 22 and 24 by any desired standard actuating means, such as a single electrical motor with standard gear or belt drive arrangements (not shown).

The heat sealing head 22 comprises a roller or drum 44 mounted on a rotatable shaft 46, the shaft 46 being operatively connected to a drive motor (not shown). Arranged on the periphery of the drum 44 are a plurality (here shown as four in number) of bars 48. Each bar 48 is constructed of heat-conductive metal and is provided with an electrical heating unit 50. The heating units 50 are supplied with electrical energy by any desirable means. The means preferably used is that disclosed in the aforesaid copending application Ser. No. 874,523. Extending from each bar 48 is an integral knife blade 52. Each knife blade is provided with one or more recesses 54.

The heat severing head 24 is similar in construction to head 22 in that it comprises a roller or drum 56, mounted for rotation on a shaft 47, and has a plurality of bars 58 on its peripheral surface, each bar being heat-conductive and having a heating unit 60 energized in the same manner as units 50. Extending from each bar 58 is at least one knife-like projection 62, the projections 62 corresponding in number and position to the recesses 54 and being substantially complementary in size and shape to the recesses 54.

Both the heads 22 and 24 coact with the impression roller 20 in their treatment of the strip 14. The impression roller 20 is mounted for rotation on a shaft 64 and is rotated in timed relationship with the heads 22 and 24, as explained above.

In operation, the laminated or tubular strip 14 is pulled off the supply roll on spindle 12 by draw roller 18, and is wrapped around the impression roller 20 and between the roller 25 and the impression roller. The draw roller 18 then continues to pull the strip off the roll. As the strip passes around the impression roller 20, the rotating sealing head 22 moves the sealing bars 48 around so that the knife blades 52 on the bars 48 contact the strip in succession; the space between the knives and the speed of rotation of the sealing head relative to the longitudinal movement of the strip determining the size of the bags. In this connection, the speed of the strip and of the sealing head 20 may be variably adjusted relative to each other by any standard type of adjusting means. The head 24, however, is rotated in synchronism with the sealing head 22 at all times.

As each knife 52 contacts the strip 14, it burns through, and, therefore, both severs and welds the severed edges of the walls of the strip together, except at the areas defined by the recesses 54 of the knife. These recesses, as shown, are just deep enough to transmit heat to the thermoplastic material sufficient to weld its walls together but there is no penetration through the strip such as is provided by the remaining portion of the knife. As a result, the portion of the strip which has been so treated is severed by the knives to form individual sealed bags, but such bags are still held together by the welds, forming so-called "nips," effected at the areas of the recesses 54.

As the strip now moves into contact with the heated knife-like projections 62 of the head 24, these projections act to cut through the welds or "nips" formed by the recesses 54 of the knives. The resulting, completely separate bags, completely sealed at the severed edges, now pass between the conveyors 26 and 28 which move them to the bin 30. The strip 14, after treatment by the sealing head 22, is illustrated in FIG. 5, the "nips" being shown at 66. The completed bags, designated 68, after treatment by the head 24, are shown in FIG. 6.

If it is desired to provide holes in the bags, such as may be required for venting purposes in certain usages, the recesses 54 are made deeper. If made sufficiently deep, no heat will be transmitted to the strip at these areas and, therefore, no welding takes place. When the bags are, thereafter, separated, as by breaking apart, holes remain at these unsealed portions. In such operation, the knife-like projections 62 may be unheated, or the head 24 may be deactivated and a roller assembly having rollers rotating at different speeds may be used to break the "nips." The latter mechanism is not illustrated since it is now a standard type of apparatus.

Figure 9:
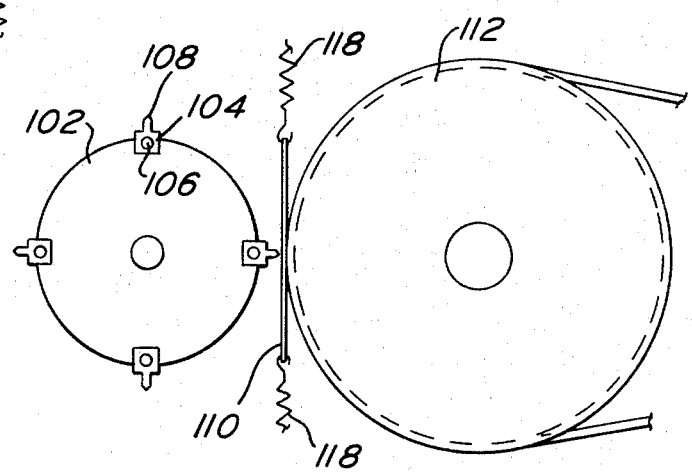
FIG. 9 is a side elevational view showing the sealing head assembly of FIG. 8 in conjunction with the impression roller.

In FIGS. 8 and 9 there is illustrated an alternative embodiment of the invention wherein the sealing head, generally designated 100, comprises a roller 102, similar to roller 22 and having similar heated bars 104 provided with electrical heating means 106. Knife portions 108 are also provided on the bars 104. However, these knife portions 108 are not provided with recesses such as those described above. Instead, a masking plate 110 is positioned between the healing head 102 and the impression roller 112. This plate 110 comprises top and bottom horizontal bars 114 and a pair of spaced vertical bars 116 connecting them. The horizontal bars are connected by opposed springs 118 to the frame of the machine (not shown).

In operation, as the sealing head 100 rotates, when the knives 108 come into contact with the strip as it passes around the impression roller 112, the bars 116 act as a mask or shield to prevent contact of the knives at those areas with the strip material, thereby forming "nips."

The masking plate 110 may be made of any desired heat insulating material such as fiberglass, Teflon, or the like. It is very thin, preferably about 0.003-inch thick. The bars 116, although shown of relatively wide dimension, are shown in that manner for better illustrative purposes, but are preferably much narrower. Furthermore, there may be only one or more than the two bars illustrated, as desired.

The springs 118 are provided to allow some play to the plate which may temporarily adhere to the strip and be carried along therewith. Without the springs, such adherance might cause the strip to be prematurely torn or broken.

Figure 10:
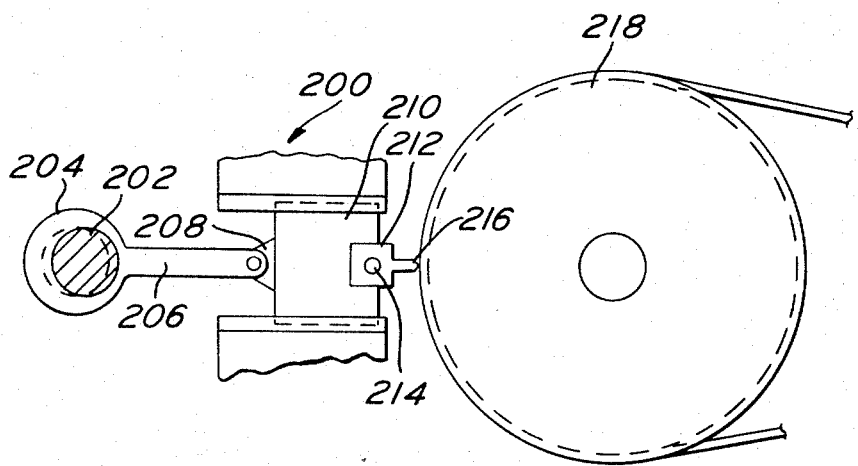
FIG. 10 is a view similar to FIG. 9 but showing another alternative embodiment of the invention.

In FIG. 10 there is shown another alternative embodiment of the invention where instead of a rotary sealing head such as described above, there is provided a reciprocating sealing head, generally designated 200, comprising a cam shaft 202 with an eccentric 204 mounted thereon. An arm 206 extends from the eccentric 204 and is connected to a lug 208 mounted on a block 210. The block 210 is provided with a bar 212 having an electrical heating means 214 connected in a standard manner to a source of electrical energy (not shown). The bar 214 is provided with a knife portion 216 adapted to contact the strip as it passes around the impression roller 218.

The knife 216 may be provided with recesses such as shown at 54 above, or it may be unrecessed as are the knives 108 in FIGS. 8 and 9, depending on the conditions of use.

The reciprocating knife means of FIG. 10 is better adapted to the intermittent type of operation where there is a significant dwell time for the sealing operation, the shaft 202 being actuated in timed relation with the movement of the strip. However, both the rotary type head and the reciprocating head may possibly be used in either continuous or intermittent type methods.

The reciprocating knife means of FIG. 10 is also very well adapted to be substituted for the severing head 24, regardless of whether the sealing head is of the rotary or reciprocating type. The device would be identical to that shown in FIG. 10 except that the knife blade 216 may be made straight, or may be provided with the same type of projections as shown at 62 for the rotary sealing head.

The invention claimed is:

1. In a bag-making machine, a heat sealing head, a rotatable impression means in closely adjacent relationship to said heat sealing head, means for moving a double-ply thermoplastic strip between said sealing head and said impression means, said sealing head comprising at least one heated knife blade movable against said strip while said strip is supported by said impression means, means for reducing the transfer of heat from said knife blade to said strip at predetermined areas along the length of said knife to form connecting nips, a severing head downstream from said sealing head and closely adjacent to and coacting with said impression means, said severing head having knife means constructed and arranged to sever said nips and form separate bags from said strip.

2. The apparatus of claim 1 wherein said means for reducing the transfer of heat comprises at least one recess in the cutting edge of said knife blade.

3. The apparatus of claim 2 wherein said recess is sufficiently deep to prevent severance by heat and pressure but permits sufficient transfer of heat to form a weld in the strip.

4. The apparatus of claim 2 wherein said recess is sufficiently deep to prevent any transfer of heat sufficient to form a weld in the strip.

5. The apparatus of claim 1 wherein said means for reducing the transfer of heat comprises a masking plate positioned between said sealing head and said impression means, said plate having at least one portion masking the contact area between said knife blade and said strip.

6. The apparatus of claim 1 wherein said sealing head comprises a rotatable drum having at least one heat conductive bar on its periphery, said bar having a heating means, and said knife blade projecting from said bar.

7. The apparatus of claim 1 wherein said sealing head comprises a reciprocable conductive bar having a heating means and said knife blade projecting from said bar.

8. The apparatus of claim 1 wherein a reciprocable severing head is provided in close adjacency to said impression means downstream from said sealing head, said severing head having knife means constructed and arranged to sever said nips.

9. The apparatus of claim 1 wherein a conveying means is movably positioned between said impression means and said severing head, said conveying means being constructed and arranged to support and convey said separate bags after said nips are severed.

10. The apparatus of claim 9 wherein said conveying means comprises oppositely disposed belt assemblies adapted to frictionally engage said separate bags between them.

11. The apparatus of claim 1 wherein said knife means on said severing head are heated.

12. The apparatus of claim 1 wherein said knife means on said severing head are unheated.

References Cited

UNITED STATES PATENTS

| | | | |
|---|---|---|---|
| 3,033,257 | 5/1962 | Weber | 156—515 |
| 3,372,797 | 3/1968 | Grevich | 156—253 |
| 3,551,259 | 12/1970 | Schwarzkopf | 156—583 |

DOUGLAS J. DRUMMOND, Primary Examiner

U.S. Cl. X.R.

156—253